United States Patent Office 3,491,441
Patented Jan. 27, 1970

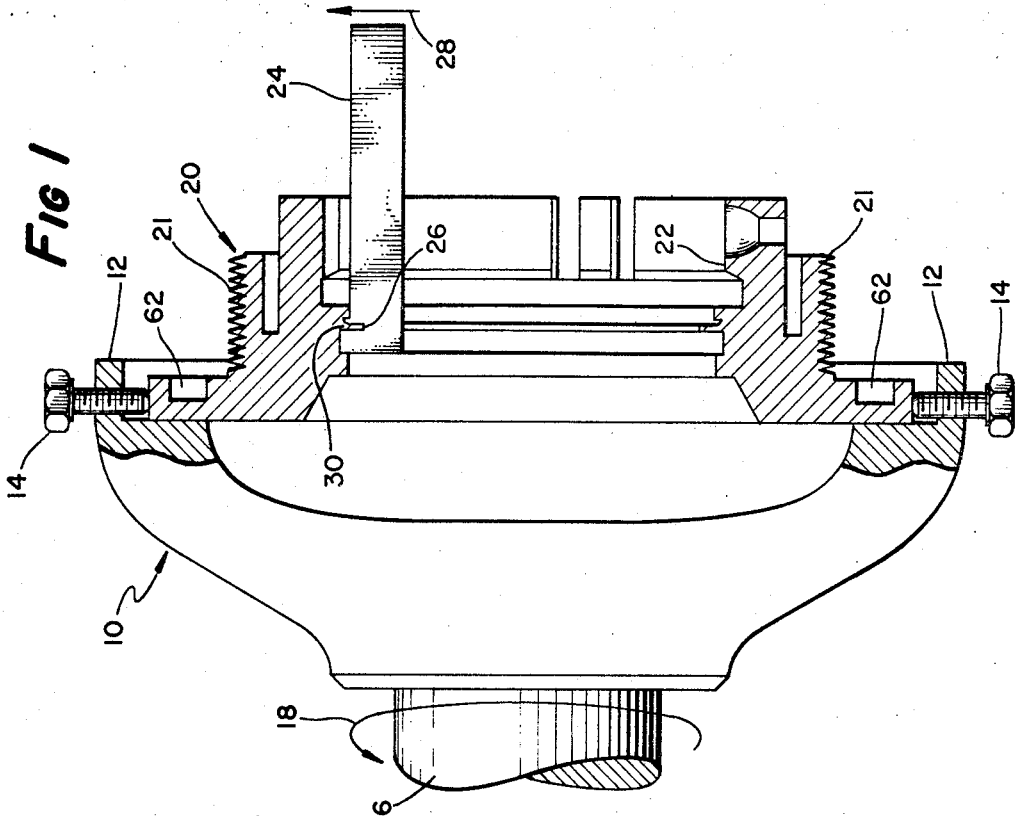
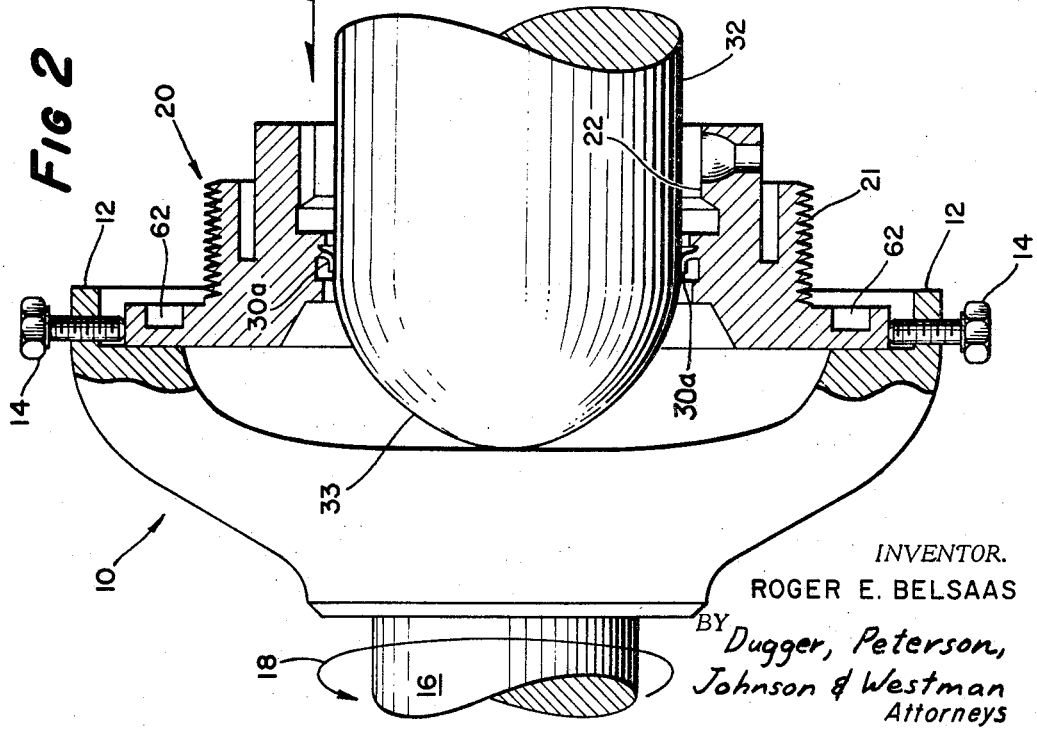

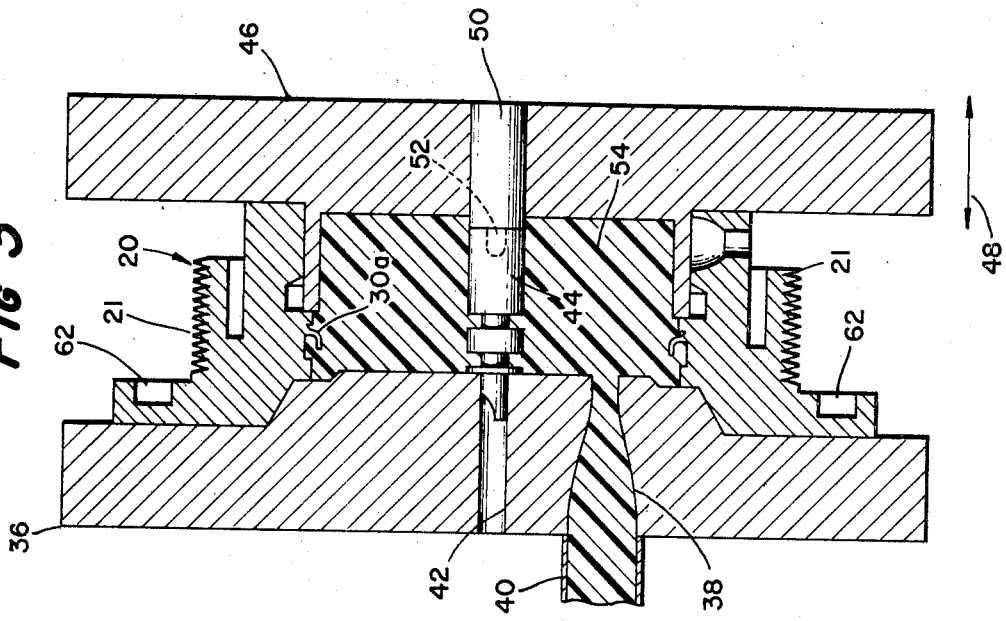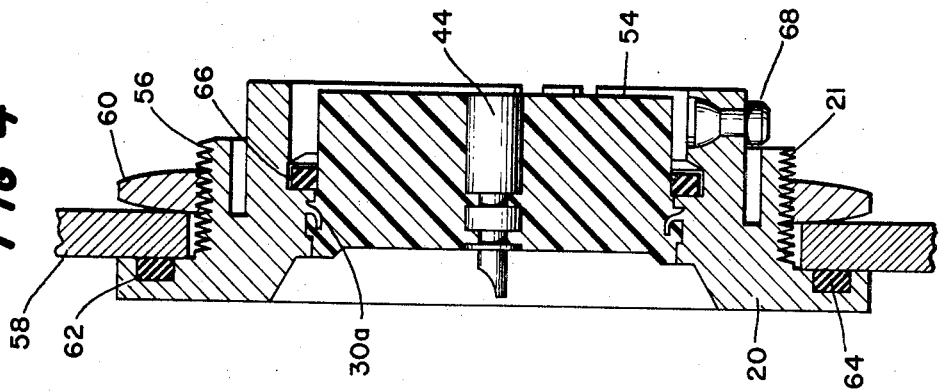

3,491,441
METHOD OF MAKING A SEALED ELECTRICAL CONNECTOR COMPONENT
Roger E. Belsaas, Minneapolis, Minn., assignor, by mesne assignments, to United-Carr Incorporated, Boston, Mass., a corporation of Delaware
Filed Sept. 27, 1967, Ser. No. 670,963
Int. Cl. H01r *43/00, 9/04*
U.S. Cl. 29—629     7 Claims

ABSTRACT OF THE DISCLOSURE

A cylindrical metal shell, preferably of aluminum, is machined so as to form therein a radial flange. The flange is quite thin and is easily bent to form an angulated or curved lip by means of a forming tool. The shell, together with one or more electrical contacts, is then placed in a mold assembly and glass-filled epoxy resin is introduced. When the resin or plastic material cools and sets, it will shrink so as to cause the plastic to contract against both the lip and the electrical contact, thereby assuring an excellent seal at the lip.

BACKGROUND OF THE INVENTION

Field of the invention

This invention relates generally to electric connectors and pertains more particularly to the method of making an air-proof or moisture-proof connector component.

Description of the prior art

Various types of sealed electrical connectors have been developed. For the most part, these connectors fall into two categories. The first involves the utilization of rubber or bonding material with a concomitant increase in cost, even then the adding of rubber or bonding materials not being completely dependable in all situations to provide a satisfactory seal. The other category alluded to requires complicated machining which can be quite expensive and at times difficult to accomplish where an intricate labyrinth must be provided to resist effectively the passage of air or moisture.

SUMMARY OF THE INVENTION

The present invention embodies the machining of a thin flange within a metallic shell and then bending the flange so as to provide a lip. Consequently, when a shrinkable plastic material, such as a glass-filled epoxy resin, is introduced into the shell, it will contract and thereby grip very firmly the lip and any number of electrical contacts that are also positioned within the shell at the time the plastic material is added.

BRIEF DESCRIPTION OF THE DRAWING

FIGURE 1 is a sectional view showing a metal shell being rotated by a chuck with a notched machine tool in the process of cutting a radial flange within the shell;

FIGURE 2 shows the use of a forming tool which imparts a curvature or angulation to the flange, thereby providing an internal lip;

FIGURE 3 is a sectional view through a mold assembly illustrating the introduction of plastic material which contracts about the lip and electrical contact there shown, and FIGURE 4 is a sectional view depicting the actual mounting of a connector component made in accordance with the teachings of my invention.

DESCRIPTION OF THE PREFERRED EMBODIMENT

As illustrated in FIGURES 1 and 2, a chuck 10 of conventional construction appears. More specifically, the chuck 10 has a ring portion 12 that accommodates a plurality of clamping screws 14. A shaft 16 causes the chuck 10 to rotate in the direction of the arrow 18. It will be appreciated that the chuck 10 can merely be mounted on the headstock of a conventional bench lathe.

The purpose of the chuck 10 is to hold a generally cylindrical metallic shell 20 of aluminum. The shell 20 may have external threads 21 and can be previously drilled to provide a bore 22 and can be counterbored to form any enlarged portions that may be desired. However, a reduced diameter portion remains for the accommodation of a cutting tool 24 having a forming notch 26 therein. The tool 24 is mounted in the tool holder of the lathe and the tool holder then is advanced laterally so that the tool 24 is fed radially outwardly in the direction of the arrow 28 as the chuck 10 is rotated in the direction of the arrow 18. In this way, a thin circular flange 30 integral with the shell is formed as can be readily discerned from FIGURE 1. It has already been mentioned that the shell 20 is of aluminum, and further assuming that it is of aircraft aluminum, the thickness of the flange 30 should not exceed 0.010 inch. Also, the radial length of the flange should be between 0.040 and 0.045 inch.

Referring now to FIGURE 2, a forming tool 32 having a rounded end 33 is advanced longitudinally of the shell 20 in the direction of the arrow 34 so as to roll over the flange 30 to form a lip that will be identified as 30a to distinguish it from the flange 30 that resides in solely a radial plane. Thus, it will be seen that the free end of the lip 30a is closer to the left end of the shell than its connected end which is integral with the body of the shell 20.

Attention is now directed to FIGURE 3 in which a mold assembly comprised of a fixed die 36 is depicted, this die having a sprue gate 38 and a nozzle 40 through which the plastic material is fed into the mold cavity as will presently be well understood. There is a clearance hold 42 formed in the die 36 so as to receive and hold one end of an electrical contact element 44. Having mentioned the electrical contact element 44, it should be explained that this element will be inserted or placed within the bore 22 of the shell 20, the particular number depending upon the use to which the completed connector component is to be put.

The mold assembly further includes a movable die 46, the die 46 actually being reciprocal in the direction indicated by the double-headed arrow 48. The die 46 contains a mold core pin 50 that positions the contact element 44, the pin 50 having a tip 52 shown in phantom outline that extends downwardly into the upper end of the contact element 44.

In actual practice, the mold assembly would be turned through 90° so that the die 36 is lowermost, but it is believed of some help to have the shell 20 oriented in the same direction in each of the four views.

A thermosetting plastic material, more specifically, glass-filled epoxy resin, has been labeled 54, being fed into the mold cavity via the sprue gate 38. The shrinkage factor rate of the alluded-to plastic material approximates 0.005 inch/inch. In other words, the plastic material 54 shrinks as it cools and sets, it will contract about the lip 30a and the inserted contact element 44. It will be recognized from the configuration of the movable die 46 that a cavity is provided so that the plastic material 54 when it hardens will have a definite shape imparted to it.

The finished connector component, which now includes the shell 20, the contact element 44 and the hardened epoxy resin 54, has been assigned the reference numeral 56 and appears in FIGURE 4. Since the purpose of the invention is to provide an electrical connector component that will be impervious to air and moisture, the component 56 has been shown attached to an apertured bulkhead 58, only fragmentarily depicted. A nut 60 threaded on the shell 20 of the component 56 draws the flanged end of the shell tightly against the side of the bulkhead opposite the nut 60. If desired, an annular groove 62 can be previously formed in the flange of the shell and a compressible gasket or O-ring 64 placed in the groove so that the sealing action in this vicinity is enhanced. Also, since it is contemplated that a mating electrical element will be received in the left end of the contact element 44, such element in many instances having a protective shroud thereabout, there is a gasket 66 disposed so that the end of such shroud will bear thereagainst. A coupling pin 68 will hold the shroud in place to effect the coupling of the two components.

The sealing action provided by the inturned lip 30a cannot be stressed too strongly. The shrinkage of the plastic material 54 will tend to bend somewhat the lip 30a back toward its radial position shown in FIGURE 1. Of course, this deflective bending is quite minimal but serves to emphasize the tight grip that is imposed upon the lip 30a. Since the lip 30a is circular, extending completely about the interior of the cylindrical shell 20, there is absolutely no avenue for air and moisture to follow. Thus, the component 56 provides a highly impervious seal and only gases that would pass directly through the plastic material 54 itself can travel from one side of the bulkhead 58 to the other. Of course, while the plastic material has been identified as an epoxy resin, other materials having a desired shrinkage factor can be employed and to some extent the imperviousness of the material will be a prime dictate in certain applications.

I claim:

1. A method of making an electrical connector seal component including a shell member having an internal integral lip of substantially an L-shape, at least one contact element, and hardened resinous insulating material within said shell encasing said lip and insulatively supporting and encasing a portion of at least one said contact element, comprising the steps of: providing an open ended shell member with a continuous, integral, internally extending, radial, lip on the internal peripheral surface of said shell between the ends thereof; bending the free end portion of said lip substantially parallel to the inner shell surface to form said L-shape; providing and placing at least one contact element within said shell and spaced therefrom; pouring a hardenable resinous insulating material into said shell to surround said element and encase said L-shaped lip, and letting said hardenable resinous insulating material harden and shrink thereby creating a seal between said shell and said contact element.

2. The method set forth in claim 1 in which said shell member is cylindrical and said lip is circular so that said lip extends completely around the interior of said shell member.

3. The method set forth in claim 2 in which said free lip edge is sufficiently thin so as to bend under the influence of the contracting forces developed as said insulating material shrinks.

4. The method set forth in claim 1 in which said insulating material is a thermosetting compound having a shrinkage factor on the order of 0.005 inch/inch.

5. The method set forth in claim 4 in which said thermosetting compound is a glass-filled epoxy resin.

6. The method set forth in claim 5 in which said shell member and lip are of aluminum and said lip has a maximum thickness of 0.010 inch.

7. The method set forth in claim 6 in which said lip has a length between 0.040 to 0.045 inch.

References Cited

UNITED STATES PATENTS

| | | | |
|---|---|---|---|
| 2,537,130 | 6/1951 | McGee et al. | 174—88.2 |
| 2,611,793 | 9/1952 | Simpson | 174—52.5 |
| 2,891,362 | 6/1959 | Bettridge | 174—52.5 |
| 3,407,491 | 10/1968 | Clevenger et al. | 29—597 |

FOREIGN PATENTS

| | | |
|---|---|---|
| 1,068,814 | 4/1956 | Germany. |
| 568,596 | 4/1945 | Great Britain. |

JOHN F. CAMPBELL, Primary Examiner

R. W. CHURCH, Assistant Examiner

U.S. Cl. X.R.

29—447, 527, 597, 627, 630; 174—52.5, 82.2, 152; 264—268, 269, 272, 274; 277—184, 235; 339—177, 218